US008655744B2

(12) United States Patent
Mourad et al.

(10) Patent No.: US 8,655,744 B2
(45) Date of Patent: Feb. 18, 2014

(54) CUSTOM HAIR COLORING IDENTIFICATION

(75) Inventors: Tamim Mourad, Los Angeles, CA (US); Omar Mourad, Los Angeles, CA (US); Francisco Gimenez, Los Angeles, CA (US); Cory Rosenberg, Los Angeles, CA (US)

(73) Assignee: eSalon.com, LLC, Marina Del Rey, CA (US)

(*) Notice: Subject to any disclaimer, the term of this patent is extended or adjusted under 35 U.S.C. 154(b) by 324 days.

(21) Appl. No.: 13/165,645

(22) Filed: Jun. 21, 2011

(65) Prior Publication Data
US 2011/0313885 A1  Dec. 22, 2011

Related U.S. Application Data

(60) Provisional application No. 61/357,029, filed on Jun. 21, 2010.

(51) Int. Cl.
*G06Q 30/00* (2012.01)

(52) U.S. Cl.
USPC ........................................... 705/26.5

(58) Field of Classification Search
CPC ................................. G06Q 30/0621
USPC ................................. 705/26.5, 500
See application file for complete search history.

(56) References Cited

U.S. PATENT DOCUMENTS

| 4,434,467 A * | 2/1984 | Scott ............................. 700/90 |
| 5,643,341 A * | 7/1997 | Hirsch et al. .................... 8/405 |
| 7,431,741 B2 * | 10/2008 | Pasquier et al. .................. 8/405 |
| 7,711,610 B2 * | 5/2010 | Iwaki et al. ................... 705/26.5 |
| 7,877,294 B2 * | 1/2011 | Inzinna, Jr. .................. 705/26.1 |
| 8,577,750 B2 * | 11/2013 | Mourad et al. ............... 705/26.5 |
| 2002/0042958 A1 * | 4/2002 | Orr et al. ........................ 8/405 |
| 2003/0149504 A1 * | 8/2003 | Iwaki et al. ................... 700/117 |
| 2004/0163188 A1 * | 8/2004 | Firkins et al. .................... 8/406 |
| 2004/0202686 A1 * | 10/2004 | Welch .......................... 424/401 |
| 2005/0036677 A1 * | 2/2005 | Ladjevardi .................... 382/162 |
| 2005/0228538 A1 * | 10/2005 | Limburger .................... 700/239 |
| 2006/0033907 A1 * | 2/2006 | Inzinna, Jr. .................... 356/45 |

(Continued)

FOREIGN PATENT DOCUMENTS

| DE | 19949033 A1 * | 4/2001 |
| EP | 1817976 A1 * | 8/2007 |
| JP | 2009301514 A * | 12/2009 |
| RU | 2308861 C1 * | 2/2006 |

OTHER PUBLICATIONS

Merriam-Webster's Collegiate Dictionary, Tenth Edition, 1997, p. 459.*

(Continued)

*Primary Examiner* — Nicholas D Rosen
(74) *Attorney, Agent, or Firm* — SoCal IP Law Group LLP; Jonathan Pearce; Steven C. Sereboff (57) ABSTRACT

There is disclosed a method for custom hair coloring formula identification. The method includes accepting user input of user characteristics including natural hair color, current hair coloring, hair treatments, hair coloring characteristics and hair treatment characteristics. The method further includes accepting user input of desired hair coloring and identifying a hair colorant suitable to create the desired hair coloring in view of the user characteristics. An order is then generated for the hair colorant.

20 Claims, 6 Drawing Sheets

(56) References Cited

U.S. PATENT DOCUMENTS

| | | |
|---|---|---|
| 2006/0036454 A1* | 2/2006 | Henderson ............... 705/1 |
| 2006/0265244 A1* | 11/2006 | Baumann ............... 705/2 |
| 2007/0180631 A1* | 8/2007 | Pasquier et al. ............... 8/409 |
| 2008/0178399 A1* | 7/2008 | Vena et al. ............... 8/407 |
| 2009/0076639 A1* | 3/2009 | Pak ............... 700/106 |
| 2009/0218007 A1* | 9/2009 | Saranow et al. ............... 141/104 |
| 2009/0248199 A1* | 10/2009 | Milhorn ............... 700/239 |
| 2010/0088036 A1* | 4/2010 | Goddard-Clark et al. ...... 702/19 |
| 2011/0220139 A1* | 9/2011 | Samain ............... 132/200 |
| 2011/0313879 A1* | 12/2011 | Mourad et al. ............... 705/26.5 |

OTHER PUBLICATIONS

Anon., "Ultress Customized Hair Color Personalized Consumers Shade Adjustment," FDC Reports—The Rose Sheet, Apr. 19, 1999, p. 3.*

Anon., "DrugEmporium.com Launches New Beauty Counter," PR Newswire, Jun. 1, 2000.*

Anon., "Top Notes," WWD, Dec. 14, 2001, p. 8.*

Kroll, L., "Fresh Face, A," Forbes, vol. 170, No. 1, p. 66, Jul. 8, 2002.*

* cited by examiner

CUSTOM HAIR COLORING IDENTIFICATION

RELATED APPLICATION INFORMATION

This patent claims benefit of the filing date of Provisional Patent Application No. 61/357,029, filed Jun. 21, 2010.

This patent is related to co-pending patent application owned by the assignee of record of the present application; the co-pending patent application with Ser. No. 13/165,707 filed on Jun. 21, 2011 and entitled "Custom Hair Coloring Supplemental Identification".

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to custom hair coloring formula identification.

2. Description of the Related Art

Hair colorant selection systems of the prior art have relied upon an individual choosing between a one size fits all box at a store or using a hair stylist selection. In the case of individual selection of hair colorants at a store, the process has primarily involved identifying an appropriate hair colorant solution by trial and error. Boxed products cannot customize a hair colorant based upon a user's characteristics, such as natural hair coloring nor can it provide instructions to use a specific coloration process and formula necessary to reach a desired color.

A multitude of individual characteristics must be taken into account in order to appropriately select and formulate a hair colorant. These include the current hair color, any current coloration or treatment of the hair, the time frame of the coloration or treatment, the desired hair color, the ability of the hair to take colorations and other treatments and numerous other user characteristics.

A hair stylist may be able to take some of these elements into account. However, a hair stylist will likely not realize or fail to take one or more of them into account on a consistent basis in making a hair colorant selection. Furthermore, the use of a hair stylist requires additional time and expense that may otherwise be unnecessary.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
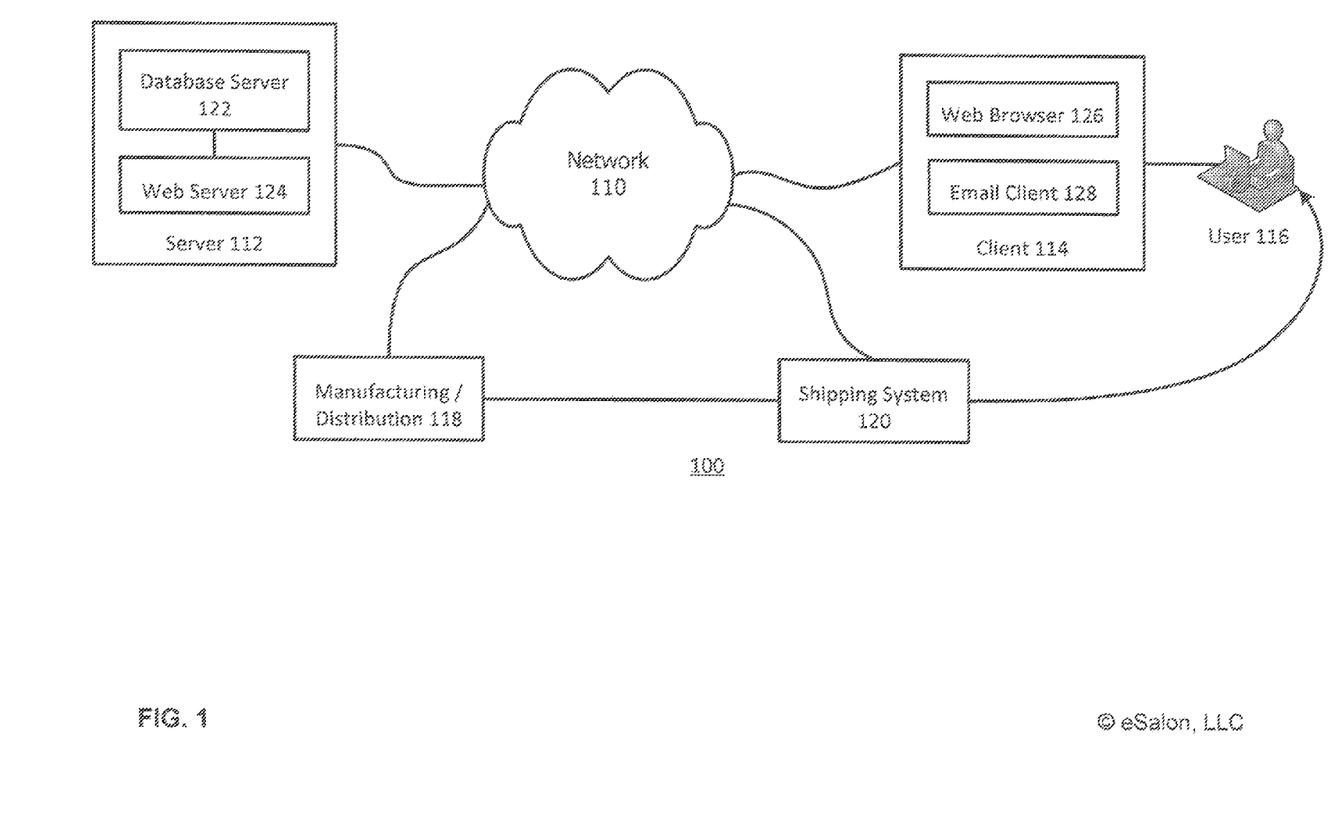
FIG. 1 is a schematic of the custom hair coloring formula identification system.

Turning now to FIG. 1, a schematic of the custom hair formula identification system is shown. The system 100 includes a network 100, connected to a server 112, a client 114, manufacturing/distribution 118 and a shipping system 120. A user 116 accesses the network 110 via the client 114. The server 112 includes a database server 122 and a web server 124. The client includes a web browser 126 and an email client 128.

The server 112 may include software operating on a computer server. The server 112 is shown as a single server incorporating a databases server 122 and a web server 124. The server 112 may be a number of interrelated servers and computing resources. In this way, the database server 122 may operate on one server while the web server 124 operates on another. The database server 122 and web server 124 may operate on a number of physical servers, each logically linked and operating in concert.

The server 112, however physically configured, is responsible for accessing the database server 122 to thereby provide the web server 124 with information to fill web pages served to the client 114. The database server 122 may contain information related to the hair products to be used, the various hair styles, colors and other characteristics that may have an effect on the user 116 selection. The database server 122 may also maintain a database of user information previously input into the system and stored for use in reordering or reformulation of hair colorant.

The user 116 accesses the server 112 using the client 114 connected to the network 110. The client incorporates a web browser 126 for accessing web pages served by the web server 124. The client 114 also includes an email client 128 for receipt of emails from the server 112 or the shipping system 120.

The manufacturing/distribution system 118 is representative of the process of creation, storage and allocation of the selected product for the user 116. Orders are transmitted from the server 112 to the manufacturing/distribution system 118 via the network 110. The manufacturing/distribution system 118 may also include the capability to send email such as order confirmation to the client 314 for review by the user 116 using the email client 128. The shipping system 120 is also connected to the network 110. It may also be directly connected to and/or collocated with the manufacturing/distribution system 118. The shipping system 120 may also include the capability to send email, such as order or shipment confirmation, to the client 114 for receipt by a user 116 via the email client 128.

Figure 2:
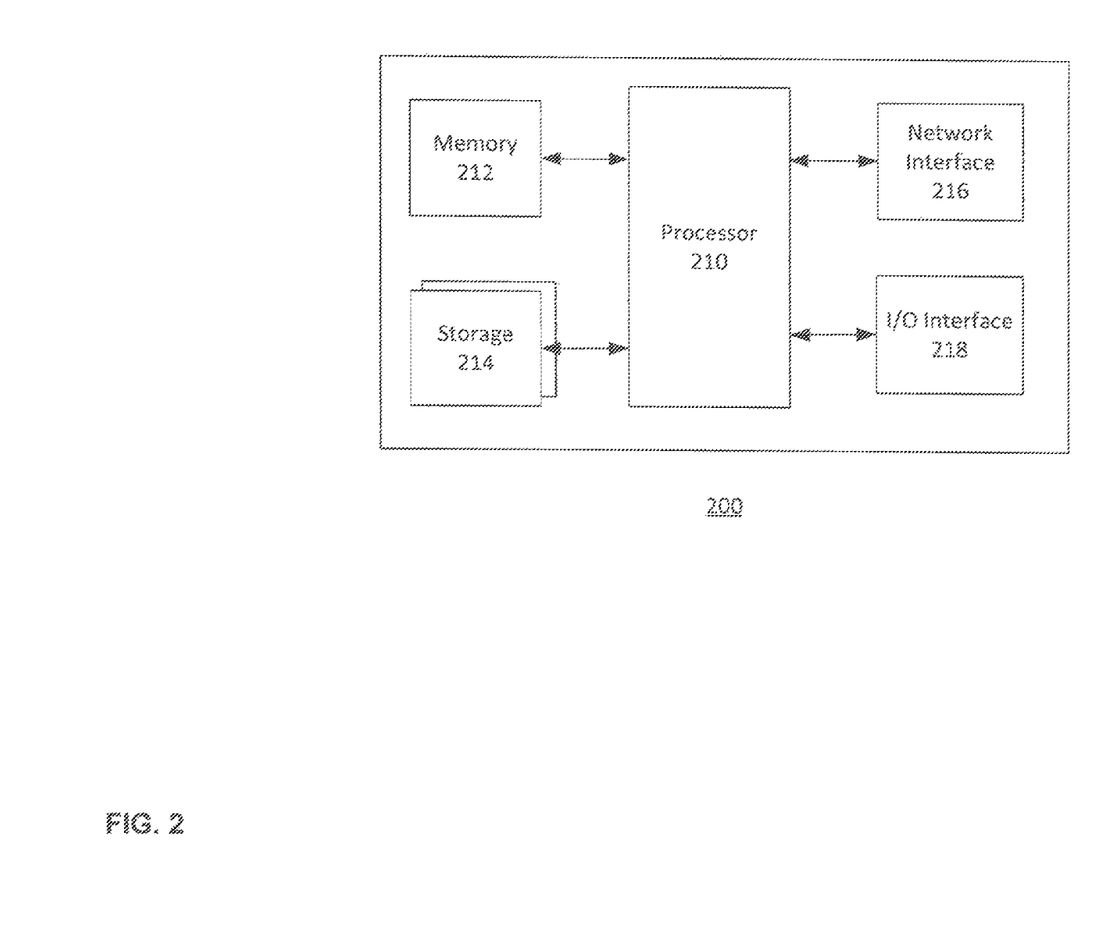
FIG. 2 is a diagram of a computing device.

Turning now to FIG. 2 there is shown a computing device 200, which is representative of the server computers, client devices, mobile devices and other computing devices discussed herein. The computing device 200 may include software and/or hardware for providing functionality and features described herein. The computing device 200 may therefore include one or more of: logic arrays, memories, analog circuits, digital circuits, software, firmware and processors. The hardware and firmware components of the computing device 200 may include various specialized units, circuits, software and interfaces for providing the functionality and features described herein.

The computing device 200 has a processor 210 coupled to a memory 212, storage 214, a network interface 216 and an I/O interface 218. The processor may be or include one or more microprocessors, field programmable gate arrays (FPGAs), application specific integrated circuits (ASICs), programmable logic devices (PLDs) and programmable logic arrays (PLAs).

The memory 212 may be or include RAM, ROM, DRAM, SRAM and MRAM, and may include firmware, such as static data or fixed instructions, BIOS, system functions, configuration data, and other routines used during the operation of the computing device 200 and processor 210. The memory 212 also provides a storage area for data and instructions associated with applications and data handled by the processor 210.

The storage 214 provides non-volatile, bulk or long term storage of data or instructions in the computing device 200. The storage 214 may take the form of a disk, tape, CD, DVD, or other reasonably high capacity addressable or serial storage medium. Multiple storage devices may be provided or available to the computing device 200. Some of these storage devices may be external to the computing device 200, such as network storage or cloud-based storage. As described herein, "storage" does not include transitory medium such as signals or electrical current. "Storage" as used herein is limited to non-transitory storage medium.

The network interface 216 includes an interface to a network such as network 110 (FIG. 1).

The I/O interface 218 interfaces the processor 210 to peripherals (not shown) such as displays, keyboards and USB devices.

Description of Processes

Figure 3:
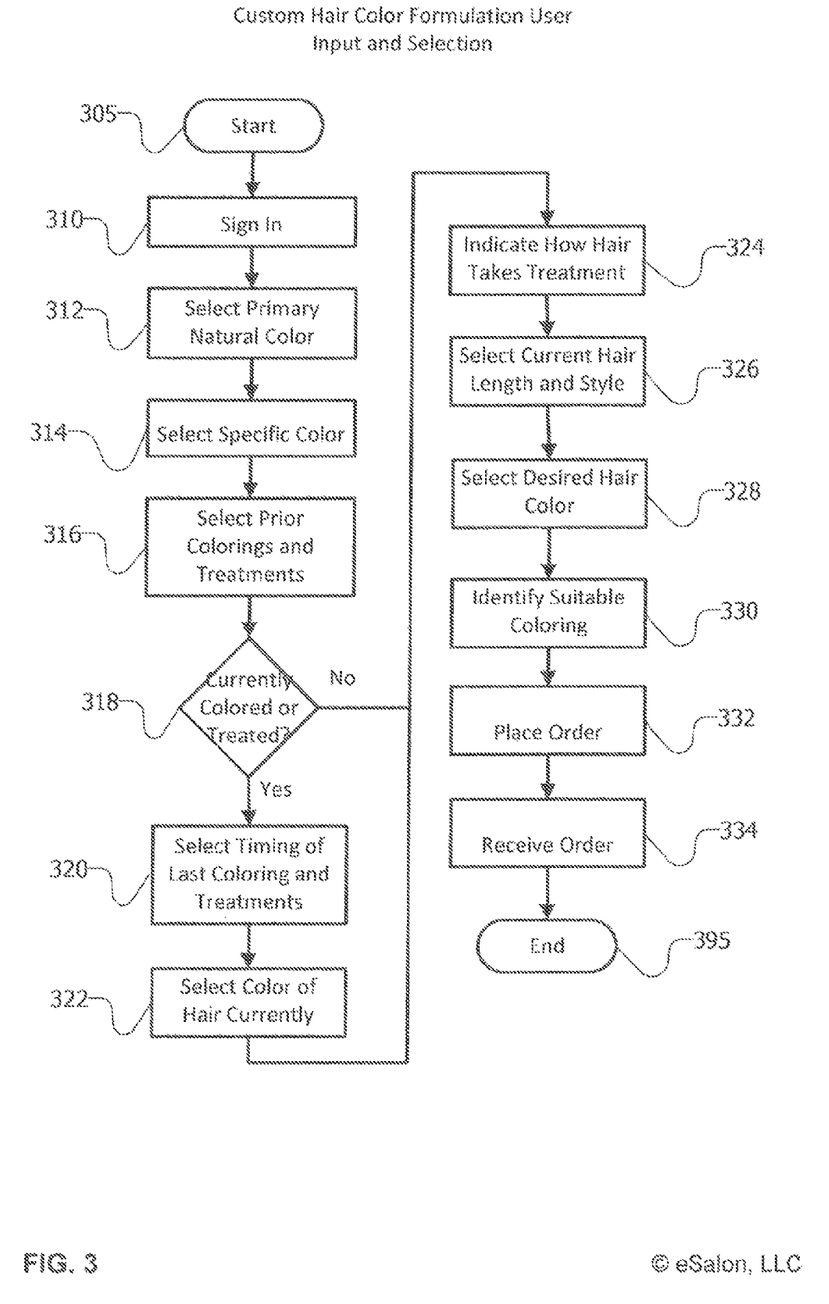
FIG. 3 is a flowchart of user input and selection.

Turning now to FIG. 3, a flowchart of a process for user input and selection is shown. The system 100 of FIG. 1 may be used in this process. The processes described are completed automatically, the term "automatically" meaning the system responds to user input without the intervention or instruction of human administrators.

The user may first sign into the system at 310. This process may include the use of a user name, customer number or email address and an associated password. The customer number may be associated with a user based upon a prior visit to a salon in which a prior treatment or hair colorant was applied.

Next, a user will select their primary natural color from a list at 312. The user may be presented with a list of primary colors, such as "blonde", "brunette", "auburn" or "black". Alternatively, a user may be presented with visual representations of these primary colors in the form of photographs of hair or models with hair of a particular color presented in a web page or other application visible to the user on a computer display. These photographs or other visual representations are designed to match, as closely as possible, the associated data that their selection indicates to the server 112

The user then selects a specific color from a range of colors associated with the selected primary natural color at 314. The user may select from a list of colors. The listing of colors may demonstrate a broad range of subtle color changes from shade to shade. Each of the specific colors may be shown to the user in a web page or other application visible to the user on a computer display. In this way, more precise color selection may be made by the user. The user's input of a precise indication of hair color will aid in selection of an appropriate colorant to reach the desired hair color.

Next, the user may then indicate whether the hair has been treated with other colors or treatments at 316. The coloring types may include permanent dyes, demi-permanent dyes, temporary dyes, visible highlights, visible lowlights, metallic dyes, color restorers or henna. The treatment types may include Brazilian keratin treatment, hair color remover, chemical relaxer, hair bleaching or a perm. The user may indicate that no treatment or coloring has been applied to the hair. The user's indication of the colorings and treatments will enable the system to better select appropriate dyes for use in the hair.

If the user indicated that their hair was previously colored or treated 318, the user may indicate the time when the last treatments were applied to the hair 320. For example, the user may enter a date. The user may be presented with a series of checkboxes indicating various time-frames. Alternatively a slider bar representing a timeline may be used. At this stage, the direction of coloring (lighter or darker) may also be indicated by the user. These details will further enable the system to better select an appropriate dye to reach the desired hair color.

If the user indicated that their hair was previously colored or treated at 318, the user may then select the color of their hair currently at 322. This provides the user the opportunity to indicate the exact current color of their hair.

If the hair is not currently treated or after selection of the current hair color if it is currently treated, the user may next indicate how the hair takes a treatment at 324. In this stage, the user may indicate that the hair takes treatment normally, doesn't take color well, that the user has fine hair or that the hair takes treatment faster than normal hair. The user may also indicate how often their hair is typically treated. Each of these indicia also provide additional basis used by the system to select the most appropriate colorant to achieve the desired hair color.

Next, the user may select their current hair length and style at 326. For example, the system may ask a user to indicate that their hair is shorter than 3 inches, between three inches and shoulder-length, shoulder length, or longer than shoulder length. A series of checkboxes, radio buttons or a slider bar may be used to generate this indication. The style choices may include straight, wavy or loose curls, defined curls or tight curls. Additional styles may also be selected. The user may also indicate whether or not their hair style includes layering. As above, photographic representations of each selection may be provided to aid a user in selection. These indicia will enable the system to further identify the appropriate hair colorant to achieve the desired hair color.

Next, the user may select the desired hair color at 328. At this stage, the user may be presented with a list of available shades. The shades may be shown as swatches of colored hair on a screen. The swatches that the user has selected as their natural hair color and their dyed hair color may be indicated on the screen. The user may select one of the swatches and an on-screen image of an individual with hair of that color may be shown to the user.

Hair colors that are not suitable in view of the various user characteristics input throughout the above process may be made unavailable to the user. For example, a user typically is not able to lighten their natural hair more than a few shades. Shades drastically lighter than the user's current hair will not be available to a user for selection. In addition, a user cannot choose any shade lighter than their current dyed color.

Once the user has selected the desired hair color, the suitable hair colorant is identified by the system at 330. This formulation and selection process is shown below with reference to FIG. 4. The user is then presented with the opportunity to place an order at 332 for the hair colorant. The user may be presented with different options for the hair colorant, such as demi-permanent or permanent colorant. In some situations, such as when a user wishes to move to a lighter hair color, demi-permanent colorants are not available. The user may also be provided with an opportunity to create a user account as a part of the process of ordering the colorant. The user account may store the data pertaining to prior orders and be used in reordering hair colorant.

Once the order is placed, the order is processed and shipped at 334. At this stage, the order is passed on to manufacturing/distribution 118 for allocation and fulfillment of the order. The hair colorant is then provided to a shipping system 120 for delivery to a user 116 (FIG. 1). The user may receive one or more emails confirming that the order is placed, that the order has been filled and that the order has been shipped.

Throughout this process, the system 100 may provide advice to the user on how to use the system and information pertinent to the hair coloration process. Help links or popups may be presented to the user in order to aid in identifying hair colors, treatments, hair styles and other characteristics. These links or popups may provide information pertaining to hair treatment, such as suggestions as to the timing of hair coloration after certain treatments or previously coloration. These links or popups may also aid users in indicating why certain colors are unavailable to them.

The flow chart has both a start 305 and an end 395, but a user may return to the start of the process or earlier stages in the process at any time. In addition, multiple users may be in various stages of the process simultaneously.

Figure 4:
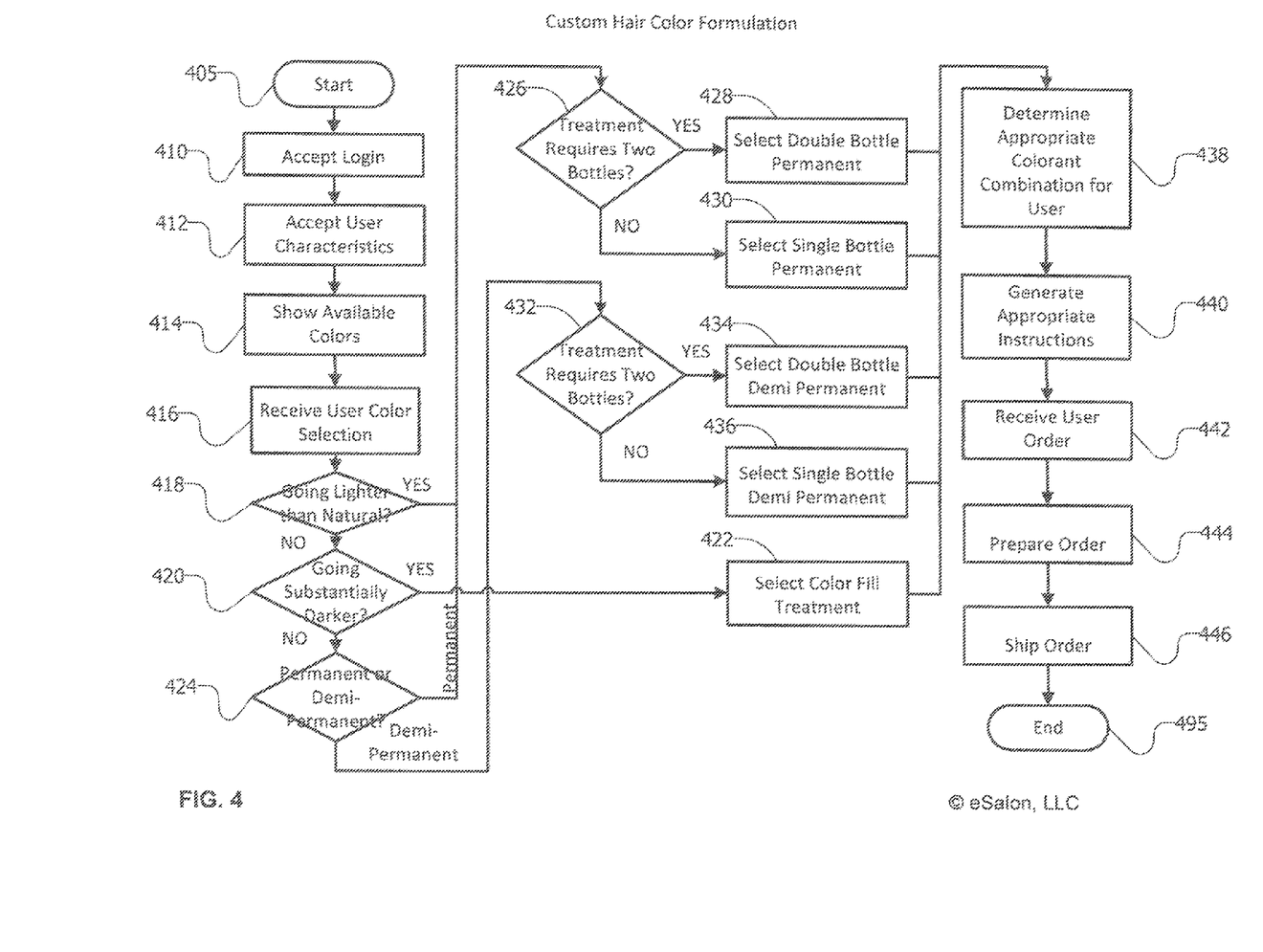
FIG. 4 is a flowchart of custom hair coloring formula identification.

Turning now to FIG. 4, a flowchart of a process 400 for custom hair coloring formula identification based upon user input and selection is shown. First a user's login is accepted at 410. If no login is available, then a user may create one. Once logged in, any previously-entered characteristics for that user that are associated with an account or session may be loaded into memory.

Next, the user characteristics are received at 412. As described with reference to FIG. 3, these characteristics may include natural hair color, natural hair highlights, current hair color, current dyes, the presence and prevalence of roots in the dyed hair, current hair treatments, the hair's typical predisposition to taking hair colorants or treatments, the hair length and any current highlights. Additional user characteristics may also be accepted at this stage.

Each of the accepted user characteristics is relevant to various aspects of the coloration process. This includes the colors and tones that may be suitable for the user's hair. For example, if a user has natural hair color that is lighter than their dyed hair color, the available colors would be limited to colors that are the same or darker shade relative to their dyed hair color.

Each of the user-input hair characteristics has an associated value. Examples of values suitable for use in the system appear in Table 1 and Table 2 below.

TABLE 1

| Number | Shade |
|---|---|
| 2 | Soft Black |
| 3 | Darkest Brown |
| 4 | Dark Brown |
| 5 | Medium Brown |
| 6 | Light Brown |
| 7 | Dark Blonde |
| 8 | Medium Blonde |

TABLE 1-continued

| Number | Shade |
|---|---|
| 9 | Light Blonde |
| 10 | Lightest Blonde |

Table 1 is an example of numbers that may be used to represent the base hair colors.

TABLE 2

| Sub-Number | Tone |
|---|---|
| X.0 | Neutral |
| X.01 | Natural Ash |
| X.03 | Natural Golden |
| X.04 | Natural Copper |
| X.1 | Ash |
| X.10 | Blue |
| X.12 | Ash Pearl |
| X.13 | Cool Beige |
| X.14 | Copper Ash |
| X.15 | Chocolate |
| X.20 | Intense Pearl |
| X.21 | Pearl Ash |
| X.23 | Pearl Golden |
| X.24 | Pearl Copper |
| X.25 | Pearl Mahogany |
| X.26 | Pearl Red |
| X.3 | Golden |
| X.31 | Warm Beige |
| X.32 | Golden Pearl |
| X.34 | Golden Copper |
| X.35 | Golden Mahogany |
| X.4 | Copper |
| X.40 | Intense Copper |
| X.41 | Copper Ash |
| X.43 | Copper Golden |
| X.45 | Copper Mahogany |
| X.5 | Mahogany |
| X.54 | Mahogany Copper |
| X.56 | Mahogany Red |
| X.6 | Red |
| X.60 | Intense Red |
| X.64 | Red Copper |
| X.65 | Red Mahogany |
| X.71 | Matte Ash |

Table 2 is an example of the sub-numbers such that the X may be replaced with the number representative of one of the base colors of Table 1. In combination a number associated with a base color of Table 1 and a sub-number associated with a tone of Table 2 may be used to represent natural hair colors, currently-dyed hair colors or desired hair colorations.

Numeric values such as those in Tables 1 and 2 may be used in conjunction with a series of algorithms and functions to derive those colorants that are suitable for a given combination of hair characteristics and to, upon selection of a desired and available target color, provide the user with a hair colorant, tone, treatment and instruction combination that is suitable for most users with similar characteristics to arrive at that hair color after treatment. Through the use of this process, unattainable colors are eliminated from a user's available selections and colorant, tone, treatment and instruction combinations that would not be suitable for a given user are also eliminated. As a result, a desired target color may be reached by a user of this system.

The input characteristics are applied to enable a user to select an available color at 414. For example, if the user has dyed hair, they may not go to a lighter shade. If the user has undyed hair, they may select up to two shades lighter than their natural hair color. Subject to these constraints, the system then receives the user color selection at 416. Next, an algorithm is applied in order to determine three elements from the input data: the type of treatment to be applied, the formulation of the colorant and the application instructions. Each of these three elements is discussed in turn below.

First, a user's natural hair color is taken into account at 418. Natural (un-undyed) hair can be lightened by two shades (see Table 1 above) and darkened as desired. If the desired hair color is lighter than their natural hair color, the user is required to use permanent color. Next, input of whether their hair is currently dyed is taken into account. If the user's desired color is substantially darker at 420 than their dyed color, or if the user has highlights, then the user is required to use a color fill treatment at 422.

If the user characteristics indicate negative responses at 418 and 420, then the user may be presented with a choice of whether to receive a permanent dye or a demi-permanent dye at 424. Next, at 426 and 432, a determination is made on whether the user requires 1 or 2 bottles of color. The two factors, which impact this, are the length of the user's hair and the color difference between their dyed color and desired color. If the user has long hair and requires color to be added to their current dyed hair, then two bottles are required at 428, 434. If the user has chosen a color substantially different from their current dyed color, then two bottles are required because of the necessity to formulate differently for the natural color and their current dyed color at 428, 434. Otherwise, in most other cases one bottle of hair color is sufficient for the user to achieve their desired color goal at 430, 436.

The formulation of the colorant itself at 438 is also affected by the user input characteristics. In the present system, colorants are classified into one of 172 different colors, each with four associated variations. These variations could include more or less of the particular tone in the selected color, half-shades lighter and darker or the addition of a neutralizing color or other color to counter unwanted pre-existing tones in the hair or current dye. The appropriate colorant combination for a user is determined at 438 based upon a table similar to the following Table 3. The combinations of Table 3 are only examples. Different or additional combinations may be used.

TABLE 3

| Criteria | Bottle 1 | Bottle 2 |
| --- | --- | --- |
| Target Color is not a "Vibrant" Color + Non-Neutral Color | 100% Target Color | 40% Target Tone and 60% Target Color |
| Target Color is not a "Vibrant" Color + Neutral Color | 100% Target Color | 100% Target Color |
| Dyed Hair = Target Color and Target Color is Vibrant and the Target Color is less than 8 and Hair is Currently Dyed | 100% Target Color | 100% Target Tone |
| Dyed Hair = Target Color and Target Color is Vibrant and the Target Color is greater than or equal to 8 and Hair is Currently Dyed | 100% Target Color | 60% Target Tone and 40% Target Color |
| Target Color is to be more than one shade lighter than Currently Dyed Hair and Target Color is "Vibrant" and Hair is Currently Dyed | 100% Target Color | 60% Target Tone and 40% Target Color |
| Hair is Not Dyed and Target Color is "Vibrant" | 100% Target Color | 40% Target Tone and 60% Target Color |
| Hair is Not Dyed and Target Color and Tone Combination is 7.60 or 7.40 | 100% Target Color | 100% Target Tone |
| Dyed Color is a Color Correction | 100% Target Color | 100% Target Color Correction |
| Treatment is Single Bottle Demi-Permanent or Permanent Treatment | 100% Target Color | N/A |
| Treatment is a Color Fill and Includes Mahogany Tones | 100% Mahogany Tone | 100% Target Color |
| Treatment is a Color Fill and Includes Gold Tones | 100% Gold Tone | 100% Target Color |

The available treatments for applying the hair colorant are a function of the various user-input characteristics. The available treatment type is function of the current color, the target color, the hair texture, hair length, hair tone, root level and whether the colorant process is the first colorant application using this system or a repeat application. Additional factors may also be relevant and applied by the algorithm. The algorithm then utilizes these variables to derive a suitable treatment type.

For example, if a user desires to move to a lighter shade relative to their natural color, then a permanent dye coupled with a developing agent are required. Another treatment example is where the user has highlights, and where they opted to cover the highlights. The user is required to use a two process color fill treatment where they first pre-pigment their highlights with the natural underlying pigment present in that shade level, and then apply the desired final color. To do otherwise would result in an unnaturally flat-looking hair color.

In addition already dyed hair will react differently to the application of colorant than un-dyed hair. As such, a user seeking to color hair that is already colored may be required to apply different treatments to their roots and dyed hair. In some cases, the roots may be given a colorant directly to the desired color while the already-dyed hair will be given a different colorant based upon that dyed color.

In another example, if a user wishes to change from a dyed color of a medium brown with a red tone to just a medium brown, then the user will be asked whether they prefer a pure medium brown or a medium brown with some remaining warmth (slight redness). If they choose a pure medium brown, then a countering color may be added to the formulation. In order to determine the proper countering color, general color theory is used to offset the red tone. In this example a certain amount of green is added to the medium brown color to counter the red tone present in their already dyed hair.

In yet another example, transitioning hair from a darker color to a lighter color exposes more of the hair's natural undertones. Accordingly, a neutralizing or offsetting color may be added to the hair colorant in order to counter other colors in the formulation. Additionally the texture of the hair, fine or coarse, thick or thin, has an effect on the extent to which the lightening happens in the hair. If the hair is thicker, for example, it will require a stronger formulation of colorant than thinner hair.

The final element dependent upon the user-input characteristics is the set of instructions that accompany the hair colorant provided to the user. Instructions are generated at 440. Depending upon the user-input characteristics and the formulation necessary to deal with those characteristics, different instructions will be automatically generated for the user. Table 4 below is an example of a table that may be used to generate suitable instructions. Other instructions, different or additional instructions for different user characteristics may be used.

TABLE 4

| Treatment Type | Hair Characteristics | Instructions | Instruction Set |
|---|---|---|---|
| Double Bottle Permanent | Virgin + Not Damaged | 2B Roots (30) Ends (30) | 8 |
| Double Bottle Permanent | Virgin + Damaged | 2B Roots (30) Ends (10) | 9 |
| Double Bottle Permanent | Not Virgin + target_tone_intensity = strong | 2B Roots (30) Ends (30) | 8 |
| Double Bottle Permanent | Not Virgin + target_tone_intensity = strong + damaged | 2B Roots (30) Ends (10) | 9 |
| Double Bottle Permanent | Not Virgin + Color Match + target_tone_intensity in (none, slight) | 2B Roots (30) Ends (5) | 10 |
| Double Bottle Permanent | Not Virgin + Color Match + target_tone_intensity = Medium + Damaged | 2B Roots (30) Ends (5) | 10 |
| Double Bottle Permanent | Not Virgin + Color Match + target_tone_intensity = Medium + Not Damaged | 2B Roots (30) Ends (10) | 9 |
| Double Bottle Permanent | Not Virgin + Not Color Match + (dyed_level = target_level) + target_tone_intensity in (Negative, None, Slight) + dyed_tone_intensity in (medium, strong) | 2B Roots (30) Ends (10) | 9 |
| Double Bottle Permanent | Not Virgin + Not Color Match + (dyed_level = target_level) + target_tone_intensity = Medium | 2B Roots (30) Ends (10) | 9 |
| Double Bottle Permanent | Not Virgin + Not Color Match + (dyed_level = target_level) + target_tone_intensity in (Negative, None, Slight) + dyed_tone_intensity in (Negative, None, Slight) | 2B Roots (30) Ends (5) | 10 |
| Double Bottle Permanent | Not Virgin + Not Color Match + (dyed_level − target_level >= 1) AND target_level < 7) | 2B Roots (30) Ends (10) | 9 |
| Double Bottle Permanent | Not Virgin + Not Color Match + (dyed_level − target_level = 1 AND target_level >= 7) and target_tone_intensity in (Negative, None, Slight) + dyed_tone_intensity in (Negative, None, Slight) | 2B Roots (30) Ends (5) | 10 |
| Double Bottle Permanent | Not Virgin + Not Color Match + (dyed_level − target_level = 1 AND target_level >= 7) and target_tone_intensity in (Negative, None, Slight) + dyed_tone_intensity in (medium, strong) | 2B Roots (30) Ends (10) | 9 |
| Double Bottle Permanent | Not Virgin + Not Color Match + (dyed_level − target_level = 1 AND target_level >= 7) and target_tone_intensity = medium | 2B Roots (30) Ends (10) | 9 |
| Double Bottle Permanent | Not Virgin + Not Color Match + (dyed_level − target_level >= 2 AND target_level >= 7) | 2B Roots (30) Ends (10) | 9 |
| Single Bottle Permanent | Color Match + Not Virgin + Not Short + Not Faded + Not Root-touchup | 1B Roots (30) | 1 |
| Single Bottle Permanent | Color Match + Not Virgin + Not Short + Faded + Intense | 1B Roots (30) Ends (30) | 2 |
| Single Bottle Permanent | Color Change Major + Not Virgin + Not Short Hair | 1B Roots (30) Ends (30) | 2 |
| Single Bottle Permanent | Color Match + Not Virgin + Faded + Not Intense + Not Short + Not Damaged + Not root-touchup | 1B Roots (30) Ends (10) | 3 |

TABLE 4-continued

| Treatment Type | Hair Characteristics | Instructions | Instruction Set |
|---|---|---|---|
| Single Bottle Permanent | Color Change Basic + Not Virgin + Not Short Hair + Not Damaged + Not Color Change Minor + Not root-touchup | 1B Roots (30) Ends (10) | 3 |
| Single Bottle Permanent | Virgin + Damaged + Not Short + Not root-touchup | 1B Roots (30) Ends (10) | 3 |
| Single Bottle Permanent | Color Match + Not Virgin + Faded + (Not Intense or Not Medium Intense) + Not Short + Damaged | 1B Roots (30) Ends (5) | 4 |
| Single Bottle Permanent | Color Change Basic + Not Virgin + Not Short Hair + Damaged | 1B Roots (30) Ends (5) | 4 |
| Single Bottle Permanent | Color Change Minor + Not Virgin + Not Short Hair + Not Damaged | 1B Roots (30) Ends (5) | 4 |
| Single Bottle Permanent | Virgin + Not Short + Not Damaged | 1B Ends (30) Roots (30) | 5 |
| Single Bottle Permanent | Short + Not root-touch-up | 1B All (30) | 6 |
| Single Bottle Permanent | root-touch-up | 1B Roots (30) No Emulsion | 7 |
| Double Bottle Demi-Perm | color_match + Faded + Not Intense + Not Virgin | 2B Roots(15) Ends (5) | 29 |
| Double Bottle Demi-Perm | color_match + Not-Faded + Intense + Not Virgin | 2B Roots(15) Ends (5) | 29 |
| Double Bottle Demi-Perm | color_change_basic | 2B Roots(15) Ends (5) | 29 |
| Double Bottle Demi-Perm | color_match + Faded + Intense + Layers | 2B Roots (15) Ends (15) | 12 |
| Double Bottle Demi-Perm | color_change_major + Layers + Non-Neutral | 2B Roots (15) Ends (15) | 12 |
| Double Bottle Demi-Perm | Virgin + (7.40 or 7.60) | 2B Roots (15) Ends (15) | 12 |
| Double Bottle Demi-Perm | color_match + Faded + Intense + No Layers | 2B All (15) | 13 |
| Double Bottle Demi-Perm | color_change_major + Neutral | 2B All (15) | 13 |
| Double Bottle Demi-Perm | color_change_major + No Layers + Non-Neutral | 2B All (15) | 13 |
| Double Bottle Demi-Perm | Virgin + != (7.40 or 7.60) | 2B All (15) | 13 |
| Double Bottle Demi-Perm | Virgin + Non-Neutral + No Layers | 2B All (15) | 13 |
| Single Bottle Demi-Perm | Color Match + Not Faded + Not short hair + Not root-touchup | 1B Roots (15) | 14 |
| Single Bottle Demi-Perm | Color Change Major + Not short hair + Not root-touchup | 1B All (15) | 15 |
| Single Bottle Demi-Perm | (Virgin or Short Hair) + Not root-touchup | 1B All (15) | 15 |
| Single Bottle Demi-Perm | Color Match + Faded Intense + Not short hair + Not root-touchup | 1B All (15) | 15 |
| Single Bottle Demi-Perm | root-touch-up | 1B Roots (15) No Emulsion | 16 |
| Single Bottle Demi-Pem | Color Change Basic + Not short hair + Not Virgin | 1B Roots(15) Ends(5) | 28 |
| Single Bottle Demi-Pem | Color Match + Not Intense Tone + Faded + Not short hair + Not Virgin | 1B Roots(15) Ends(5) | 28 |

This Table 4 or one similar to it may be used to determine the appropriate instructions for a particular colorant. "Intense" colors in Table 4 include brighter reds and lighter blondes. The variables making up the hair characteristics are evaluated as a set of combined variables in order to determine the appropriate instructions to provide to a user. The instruction set is a reference number referring to a pre-generated set of instructions that are associated with a particular combination of treatment type and hair characteristics.

By way of example for the creation and use of the instructions, generally a user with no current dye or treatment in their hair will be instructed to first apply color to their ends, then to their roots. Similarly, a user with dye currently in their hair will generally be instructed to first color their roots (to cover any change since the application of the last colorant), then to color their ends.

In another example, if a user has indicated that their hair does not take treatment well or that their hair is particularly accepting of treatment, then the instructions will be modified as to the length of time the colorant is applied to the hair. The determination whether a user's hair is likely to take color easily or to be resistant to color is made based upon user input experience, hair color and ethnicity. The hair of certain ethnic groups is more resistant to colorant than others.

In yet another example, if a user currently has dyed hair and is seeking a change of a few shades from the current color to the new color, then the exposure time on the ends of the hair must be increased based upon the distance on the scale between the shades. In addition, if the desired color is a brighter or more powerful color, such as an intense red tone, than the current color, such as a golden blonde, less time is necessary.

Suitable instructions are generated based upon all of the characteristics input by a user, the type of treatment necessary and the combination of colorants required for the target color and the target tone. The varying elements include the time of application and the locations in the hair to which the colorant elements are applied. These instructions will be included along with the hair colorant provided as a result of this process.

The manufacturing/distribution system 118 will receive the user order at 442, including all of the information necessary to provide the identified colorant to the user. The order is prepared by the shipping system 120 at 444 and then shipped to the user at 446.

The flow chart has both a start 405 and an end 495, but the system may return to the start of the process or earlier stages in the process at any time. In addition, multiple users may be in various stages of the process simultaneously.

Figure 5:
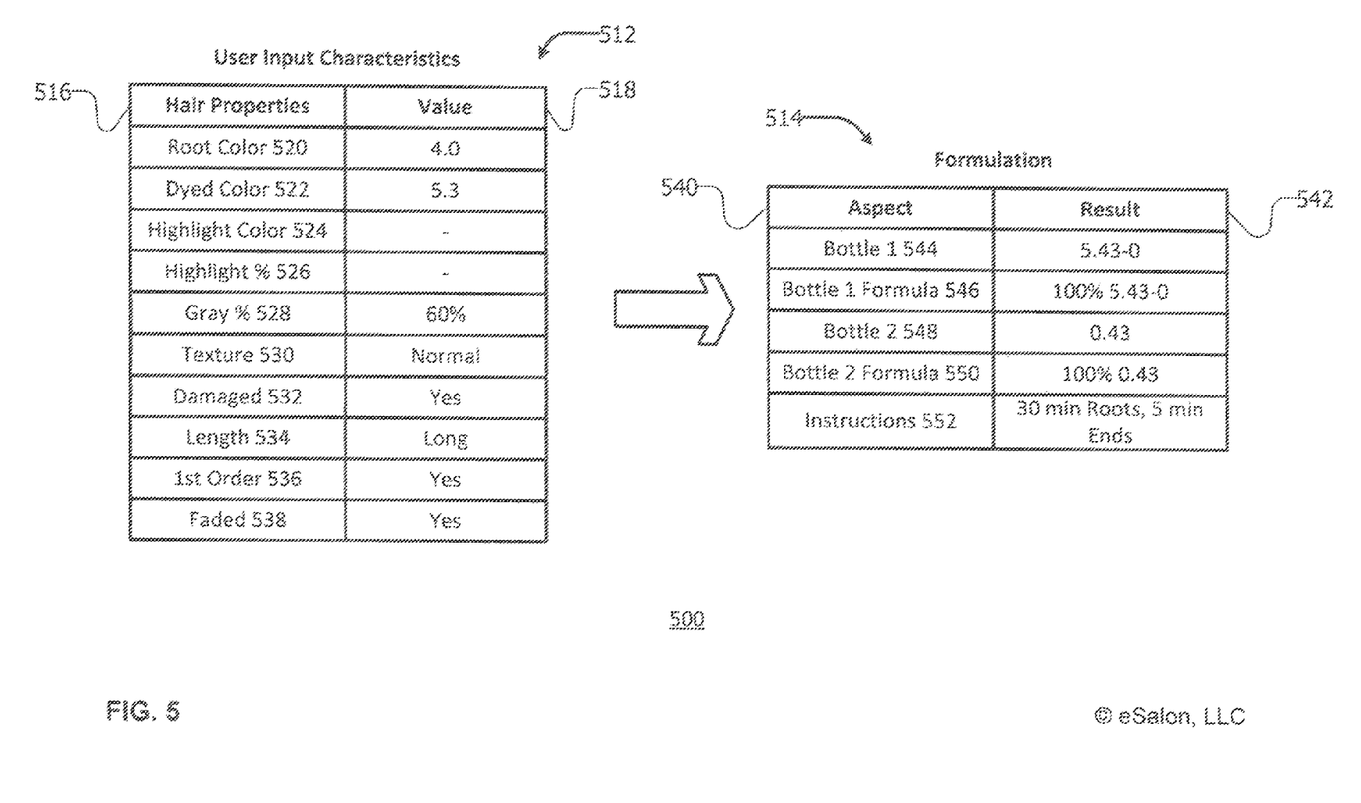
FIG. 5 is an example of user input characteristics and the resulting formula identification.

Turning now to FIG. 5 an example of user input characteristics 512 and the resulting formula identification 514 is shown. The user input characteristics include the hair properties 516 and the value 518 used to represent those characteristics in the present system. These are both based upon the information provided by a user during the formulation process. More or fewer characteristics may be accepted by the system in making the formulations.

The first element is the root color 520, which in this example has a value of 4.0. As can be seen in Tables 1 and 2 above, 4.0 is representative of a dark brown color with a neutral tone. However, the user's dyed color 522 indicates that the user has dyed their hair to a 5.43, medium brown with a copper golden tone. The user does not have any highlight color 524 or highlight percentage 526. This is because the user has not added highlights to the hair coloring previously done. However, this user has a natural gray percentage 528 of approximately 60%.

The hair also has a normal texture 530 and is damaged 532. This damage is usually the result of applying coloration to the hair or other treatments. The length 534 of the hair is long. This is a first order 536 which means that this is not a reapplication of color, but a first application. The hair is also faded 538 from the previous application of dye.

The dyed color 522 limits colors to shades of medium brown or darker. Additionally certain colors in the medium brown shade level are also eliminated as achieving these specific tones is not possible without darkening the overall color. In response to this input and the elimination of unachievable colors from their selection, the user has selected to color their hair to a 5.43-0 (medium brown with copper golden tones), different from the previously dyed color 522.

As a result, the formulation 514 is made which is made up of a number of aspects 540 with corresponding results 542. The treatment type selected is a double bottle permanent treatment. Permanent color is required because the user has selected to move one shade lighter than their natural color. If the color were the same or darker than the natural color, then the user could select permanent or demi-permanent colorant. In addition, the user will receive two bottles because of the hair length 534 and the tone that is only to be applied the ends (non-root portion) of the hair.

The bottle 1 544 is to be color 5.43-0 which includes a base color of a 5.0 (medium brown) and a 0.43 tone (copper golden). The first bottle formula 546 is 100% of the bottle 1 544. Bottle 2 548 is made up of only the 0.43 tone (copper golden). Bottle 2 formulation 550 is 100% of the bottle 2 548 because it is to be used only on the ends of the hair to make the tone of the ends match that of the roots. The 0.43 tone (copper golden) was selected automatically by the system because the copper gold tone will augment the already dyed hair (5.3) to the desired color without darkening the hair.

The user is then provided instructions 552 based upon the user input characteristics 512 and the resulting formulation 514. The user is to use the first bottle on the roots for 30 minutes and to use the second bottle on the ends for 5 minutes. The user must use the permanent dye of bottle 1 544 on the roots for 30 minutes in order to lighten the hair to the appropriate shade to match the ends. The user must then use bottle 2 548 on the ends to make the tone of the hair uniform from roots to ends. Ordinarily, a user would be instructed to use bottle 2 548 for 10 minutes on the ends, but this user's hair is already damaged 532 from prior treatment. As a result, less time is recommended. In addition, the user's dyed color vs. their desired color is relatively similar. Therefore, less application time is needed on the ends.

Figure 6:
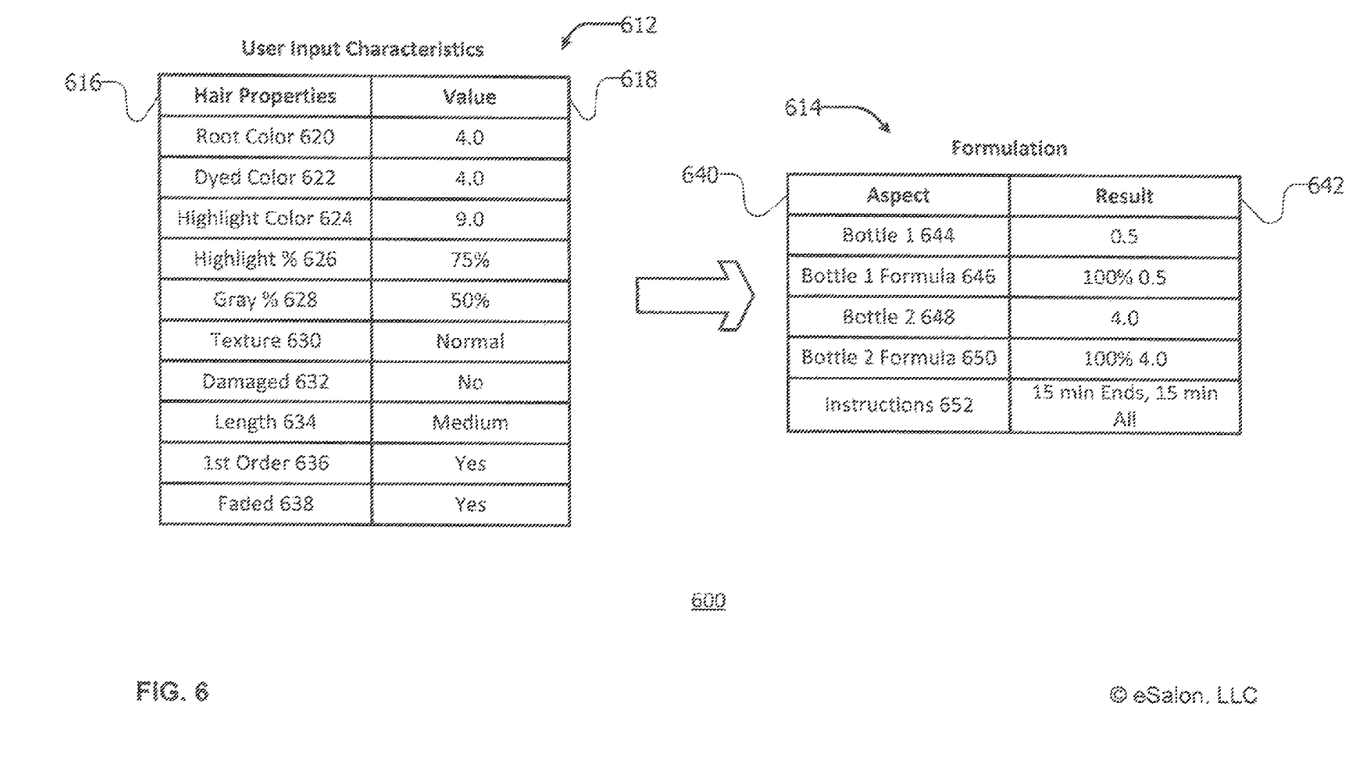
FIG. 6 is an example of user characteristics and the resulting formula identification.

Turning now to FIG. 6, another example 600 of user input characteristics 612 and the resulting formula identification 614 are shown. The user input characteristics 612 include hair properties and the associated value 618. Each aspect of the formulation 614 includes an aspect 640 and the result 642.

The first property is the root color 620 and the dyed color 622. In this example, both are 4.0 (dark brown with no tone). However, the hair includes a highlight color 624 of 9.0 (light blonde with no tone). The highlight percentage 626 is 75% in this example. The hair also includes a gray percentage 628 of 50%.

The hair is of normal texture 630 and is not damaged 632. The hair's length 624 is medium. This is the individual's first order 636 and the hair color is faded 638.

As a result of these user input characteristics 612, the formulation 614 includes two bottles, bottle 1 644 and bottle 2 648. Bottle 1 644 includes only a 0.5 (mahogany) tone. The bottle 1 formula 646 calls for 100% of 0.5. Some other formulations may call for two tones to be blended to create a composite tone. Bottle 2 is 4.0 (dark brown) with no tone; the bottle 2 formula 650 calls for 100% of 4.0. The instructions 652 selected to be provided to the user indicate that bottle 1 644 should be applied to the ends/highlights for 15 minutes and that bottle 2 648 should be applied to all of the hair for 15 minutes.

Because the user's dyed color 622 was the same as the root color 620, the user's options were limited to that shade or darker. The presence of highlights requires the user to utilize a pre color to first fill in the highlights with the natural undertone color which exists in dark brown hair, then followed by an allover application of the desired color. Fill colors are generally available in demi-permanent.

Because a color fill treatment is being used, a two-step process must be employed. First, the tone 0.5 (mahogany) is added to the ends for 15 minutes, then the 4.0 (dark brown) colorant is applied to the entire hair. Without this tone, the hair, particularly the highlighted areas, would appear unnaturally flat after the application of the dye. In most situations in which a color fill treatment is necessary, either a 0.5 a 0.3 or a combination of the two are used. After the color fill treatment, the desired hair coloration is applied. The single set of instructions 652, automatically generated based upon the user input characteristics 612 and the formulation 614, describes this process.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for custom hair coloring formula identification comprising:
   accepting user input at a server, from which user characteristics for hair of a user are derived, the user characteristics including natural hair color, current hair coloring, hair treatments, hair coloring characteristics, presence of roots in the hair, and a current length of the hair;
   identifying unavailable hair colors and available hair colors, using the server, the unavailable colors and the available hair colors identified based upon the user characteristics, including the presence of roots;
   providing indicia of the available hair colors to the user;
   accepting, into the server, user input of desired hair color selected from among the available hair colors;
   identifying automatically a hair colorant suitable to create the desired hair color in view of the user characteristics, wherein the presence of roots in the hair results in a formula identification including at least two bottles, a first bottle including a base color for the roots and a second bottle including a tone for at least a portion of the hair other than the roots; and
   receiving an order for the hair colorant.

2. The method of claim 1 wherein the accepting user input of natural hair color, current hair coloring and desired hair coloring includes accepting user selections with reference to a table of hair colors visible on a computer display.

3. The method of claim 1 further comprising:
   processing the order for the hair colorant to thereby identify and request shipment of the hair colorant; and
   shipping the hair colorant according to the order.

4. The method of claim 1 wherein each of the user inputs are accepted via at least one web page and further wherein on each of the at least one of web page, the user is presented with a number of options from which to choose.

5. The method of claim 1 further comprising identifying an appropriate instruction set, from a set of predetermined instruction sets, for use in applying the colorant in view of the hair colorant identified and the user characteristics.

6. The method of claim 1 further comprising:
   providing indicia of unavailable hair colors along with the indicia of available hair colors; and
   indicating that the user cannot achieve the unavailable hair colors based upon the user characteristics.

7. The method of claim 1 wherein the second bottle includes the base in a different concentration from the first bottle.

8. An apparatus for custom hair coloring formula identification comprising a server configured with programming instructions which, when executed, cause the server to:
   accept user input from which user characteristics for hair of a user are derived, the user characteristics including natural hair color, current hair coloring, hair treatments, hair coloring characteristics, hair treatments, hair coloring characteristics, presence of roots in the hair, and a current length of the hair;
   identify unavailable hair colors and available hair colors, the unavailable colors and the available hair colors identified based upon the user characteristics;
   provide indicia of the available hair colors to the user;
   accept user input of desired hair coloring, the desired hair coloring selected from among the available hair colors;
   identify a hair colorant suitable to create the desired hair coloring in view of the user characteristics, wherein the presence of roots in the hair results in a formula identification including at least two bottles, a first bottle including a base color for the roots and a second bottle including a tone for at least a portion of the hair other than the roots; and
   generate an order for the hair colorant.

9. The apparatus of claim 8 wherein the accepting user input of natural hair color, current hair coloring and desired hair coloring includes user selection with reference to a table of hair colors visible on a computer display.

10. The apparatus of claim 8 further comprising:
    a distribution system for processing the order for the hair colorant to thereby identify and request shipment of the hair colorant; and
    a shipping system for preparing the shipment of the hair colorant according to the order.

11. The apparatus of claim 8 wherein each of the user inputs are accepted via at least one web page and further wherein on each of the at least one web page, the user is presented with a number of options from which to choose.

12. The apparatus of claim 8 wherein the server configured with programming instructions which, when executed, further cause the server to identify an appropriate instruction set, from a set of predetermined instruction sets, for use in applying the colorant in view of the hair colorant identified and the user characteristics.

13. The apparatus of claim 8 wherein the programming instructions which, when executed, further cause the server to:

provide indicia of unavailable hair colors along with the indicia of available hair colors; and indicate that the user cannot achieve the unavailable hair colors based upon the user characteristics.

14. The apparatus of claim 8 wherein the second bottle includes the base in a different concentration from the first bottle.

15. Apparatus comprising a storage medium storing program instructions which when executed by a processor will cause the processor to:

accept user input from which user characteristics for hair of a user are derived, the user characteristics including natural hair color, current hair coloring, hair treatments, hair coloring characteristics, presence of roots in the hair, and a current length of the hair;

identify unavailable hair colors and available hair colors, the unavailable colors and the available hair colors identified based upon the user characteristics;

provide indicia of the available hair colors to the user;

accept user input of desired hair coloring, the desired hair coloring selected from among the available hair colors;

identify a hair colorant suitable to create the desired hair coloring in view of the user characteristics, wherein the presence of roots in the hair results in a formula identification including at least two bottles, a first bottle including a base color for the roots and a second bottle including a tone for at least a portion of the hair other than the roots; and generate an order for the hair colorant.

16. The apparatus of claim 15 wherein the instruction to accept user input of natural hair color, current hair coloring and desired hair coloring includes user selection with reference to a table of hair colors visible on a computer display.

17. The apparatus of claim 15 further comprising instructions which when executed by a processor will cause the processor to:

process the order for the hair colorant to thereby identify and request shipment of the hair colorant; and generate a shipping request in order to ship the hair colorant according to the order.

18. The apparatus of claim 15 wherein each of the user inputs are accepted via at least one web page and further wherein on each of the at least one web page, the user is presented with a number of options from which to choose.

19. The apparatus of claim 15 wherein program instructions which, when executed, by a processor will cause the processor to identify an appropriate instruction set, from a set of predetermined instruction sets, for use in applying the colorant in view of the hair colorant identified and the user characteristics.

20. The apparatus of claim 15 wherein program instructions which, when executed, by a processor will cause the processor to:

provide indicia of unavailable hair colors along with the indicia of available hair colors; and indicate that the user cannot achieve the unavailable hair colors based upon the user characteristics.

* * * * *

UNITED STATES PATENT AND TRADEMARK OFFICE
CERTIFICATE OF CORRECTION

PATENT NO.         : 8,655,744 B2
APPLICATION NO.    : 13/165645
DATED              : February 18, 2014
INVENTOR(S)        : Mourad et al.

It is certified that error appears in the above-identified patent and that said Letters Patent is hereby corrected as shown below:

In the Specification

Column 2, line 13: after "hair" add --coloring--.

Column 2, line 15: replace "network 100" with --network 110--.

Signed and Sealed this
Twenty-seventh Day of May, 2014

Michelle K. Lee
*Deputy Director of the United States Patent and Trademark Office*